(12) United States Patent
Lin

(10) Patent No.: US 8,769,252 B2
(45) Date of Patent: Jul. 1, 2014

(54) COMPUTER SYSTEM AND METHOD FOR RESETTING THE SAME

(75) Inventor: Wei-Chih Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 400 days.

(21) Appl. No.: 13/221,933

(22) Filed: Aug. 31, 2011

(65) Prior Publication Data
US 2012/0311310 A1    Dec. 6, 2012

(30) Foreign Application Priority Data

Jun. 1, 2011    (TW) ............................... 100119240 A

(51) Int. Cl.
*G06F 9/00*    (2006.01)
(52) U.S. Cl.
USPC .................................................... 713/1; 713/2
(58) Field of Classification Search
None
See application file for complete search history.

(56) References Cited

U.S. PATENT DOCUMENTS

| | | | | |
|---|---|---|---|---|
| 5,638,510 A | * | 6/1997 | Ishikawa | ......................... 714/51 |
| 5,875,293 A | * | 2/1999 | Bell et al. | ........................ 714/27 |
| 7,292,141 B2 | | 11/2007 | Staats et al. | |
| 2001/0027537 A1 | * | 10/2001 | Nada et al. | ....................... 714/23 |
| 2005/0242942 A1 | * | 11/2005 | Staats et al. | .................. 340/506 |

FOREIGN PATENT DOCUMENTS

TW    201102923    11/2011

OTHER PUBLICATIONS

"Office Action of Taiwan Counterpart Application" with English translation thereof, issued on Dec. 31, 2013, p. 1-p. 9, in which the listed references were cited.

* cited by examiner

*Primary Examiner* — Paul Yanchus, III
(74) *Attorney, Agent, or Firm* — Jianq Chyun IP Office

(57) ABSTRACT

A computer system and a method for resetting the same are provided. The computer system includes a basic input output system (BIOS) chip and a keyboard controller. In the method, the BIOS chip monitors the keyboard controller to determine whether a time that the keyboard controller remains in a hang up state reaches an idle time limit. Besides, the keyboard controller monitors the BIOS chip to determine whether a time that the BIOS chip remains in the hang up state reaches the idle time limit When it is determined that the time of one of the BIOS chip and the keyboard controller remaining in the hang up state reaches the idle time limit, the computer system is reset in accordance with a hardware reset signal trigger by the other one of the BIOS chip and the keyboard controller.

12 Claims, 3 Drawing Sheets

The BIOS chip and the keyboard controller monitor each other to determine whether a time that the counter party remains in a hang up state reaches an idle time limit — S210

When it is determined that the time that one of the BIOS chip and the keyboard controller remains in the hang up state reaches the idle time limit, the other one of the BIOS chip and the keyboard controller sends a hardware reset signal to reset the computer system — S220

COMPUTER SYSTEM AND METHOD FOR RESETTING THE SAME

CROSS-REFERENCE TO RELATED APPLICATION

This application claims the priority benefit of Taiwan application serial no. 100119240, filed on Jun. 1, 2011. The entirety of the above-mentioned patent application is hereby incorporated by reference herein and made a part of this specification.

BACKGROUND OF THE INVENTION

1. Field of the Invention

The invention relates to a computer system. Particularly, the invention relates to a computer system capable of automatically resetting during system failure and a method for resetting the same.

2. Description of Related Art

With development of technology, popularity of computer systems is gradually increased year by year. The computer systems are no longer limited to applications of professional fields, but are indispensable in people's daily life. In order to cope with a modern lifestyle, laptop computers or tablet personal computers (PCs) with both high performance and portability are increasingly favored by consumers.

In order to draw attention of the consumers, an appearance of the computer system is generally developed to be miniaturized according to the current trend of portability. Therefore, in a mechanism design, a volume of a battery has to be accordingly reduced. To cope with such demand, in mechanism designs of a part of the computer products, a user cannot detach the battery from the computer system. In this case, when the computer system has a system failure or an internal firmware thereof has a problem, the user cannot simply unplug the battery to reset the computer system. On the other hand, when the computer system has the system failure due to a problem of an internal keyboard controller, even if the user presses a power button or a reset button of the computer system, the computer system cannot be turned off or reset according to a predetermined procedure due to that the keyboard controller cannot normally operate. Therefore, the user probably has to send the computer system to a manufacturer's service station for repairing, which may have a negative influence on after-sale service cost of the manufacturer.

SUMMARY OF THE INVENTION

Accordingly, the invention is directed to a method for resetting a computer system, which is capable of automatically resetting the computer system when detecting a system failure of the computer system.

The invention is directed to a computer system, which is capable of automatically resetting in case of system failure without pressing a resetting button or unplugging a battery.

The invention provides a method for resetting a computer system, the computer system includes a basic input output system (BIOS) chip and a keyboard controller. In the method, the BIOS chip monitors the keyboard controller to determine whether a time that the keyboard controller remains in a hang up state reaches an idle time limit. Besides, the keyboard controller monitors the BIOS chip to determine whether a time that the BIOS chip remains in the hang up state reaches the idle time limit. When it is determined that the time of one of the BIOS chip and the keyboard controller remaining in the hang up state reaches the idle time limit, the other one of the BIOS chip and the keyboard controller triggers a hardware reset signal to reset the computer system.

In an embodiment of the invention, the step that the BIOS chip monitors the keyboard controller to determine whether the time that the keyboard controller remains in the hang up state reaches the idle time limit comprises following steps. The BIOS chip reads a first specific address of an internal memory of the keyboard controller every a first time interval, and determines whether a buffer status flag is opportunely set to a specific value. When the buffer status flag is not opportunely set to the specific value, the BIOS chip accumulates a keyboard controller error count value, which represents that the keyboard controller is in the hang up state. Comparatively, when the buffer status flag is opportunely set to the specific value, the BIOS chip zeroizes the keyboard controller error count value, which represents that the keyboard controller is in a normal working state. The BIOS chip repeats the above steps and when the keyboard controller error count value is greater than a first value, it is determined that the time that the keyboard controller remains in the hang up state reaches the idle time limit, where a product of the first time interval and the first value is smaller than or equal to the idle time limit.

In an embodiment of the invention, after the step that the BIOS chip zeroizes the keyboard controller error count value, the method for resetting the computer system further includes the BIOS chip zeroizing a BIOS chip error count value recorded in a second specific address of the internal memory of the keyboard controller.

In an embodiment of the invention, the step that the keyboard controller monitors the BIOS chip to determine whether the time that the BIOS chip remains in the hang up state reaches the idle time limit comprises following steps. The keyboard controller reads and accumulates the BIOS chip error count value every a second time interval. The keyboard controller repeats the above step, and when the BIOS chip error count value is greater than a second value, it is determined the time that the BIOS chip remains in the hang up state reaches the idle time limit, where a product of the second time interval and the second value is smaller than or equal to the idle time limit.

In an embodiment of the invention, the method for resetting the computer system further includes following steps. The keyboard controller sends an interrupt signal to the BIOS chip every a third time interval, where the third time interval is smaller than the idle time limit The BIOS chip zeroizes the keyboard controller error count value after receiving the interrupt signal, which represents that the keyboard controller is in the normal working state.

According to another aspect, the invention provides a computer system including a power management circuit, a basic input output system (BIOS) chip and a keyboard controller. The power management circuit is used for managing a power of the computer system. The BIOS chip is coupled to the power management circuit, and the keyboard controller is coupled to the power management circuit and the BIOS chip. The BIOS chip monitors the keyboard controller to determine whether a time that the keyboard controller remains in a hang up state reaches an idle time limit, and the keyboard controller monitors the BIOS chip to determine whether a time that the BIOS chip remains in the hang up state reaches the idle time limit. When it is determined that the time of one of the BIOS chip and the keyboard controller remaining in the hang up state reaches the idle time limit, the other one of the BIOS chip and the keyboard controller sends a hardware reset signal to the power management circuit to control the power management circuit to turn off and then turn on the power of the computer system.

In an embodiment of the invention, the BIOS chip periodically reads a first specific address of an internal memory of the keyboard controller every a first time interval, and determines whether a buffer status flag is opportunely set to a specific value. When the buffer status flag is not opportunely set to the specific value, the BIOS chip accumulates a keyboard controller error count value, and when the buffer status flag is opportunely set to the specific value, the BIOS chip zeroizes the keyboard controller error count value. When the keyboard controller error count value is greater than a first value, the BIOS chip determines the time that the keyboard controller remains in the hang up state reaches the idle time limit, where a product of the first time interval and the first value is smaller than or equal to the idle time limit In an embodiment of the invention, after the BIOS chip zeroizes the keyboard controller error count value, the BIOS chip zeroizes a BIOS chip error count value recorded in a second specific address of the internal memory of the keyboard controller.

In an embodiment of the invention, the keyboard controller periodically reads and accumulates the BIOS chip error count value every a second time interval. When the BIOS chip error count value is greater than a second value, the keyboard controller determines the time that the BIOS chip remains in the hang up state reaches the idle time limit, where a product of the second time interval and the second value is smaller than or equal to the idle time limit.

In an embodiment of the invention, the keyboard controller periodically sends an interrupt signal to the BIOS chip every a third time interval. The BIOS chip zeroizes the keyboard controller error count value after receiving the interrupt signal, where the third time interval is smaller than the idle time limit.

In an embodiment of the invention, the BIOS chip and the keyboard controller respectively transmit the hardware reset signal to the power management circuit through a general purpose input/output pin.

In an embodiment of the invention, the BIOS chip and the keyboard controller are communicated though a low pin count (LPC) interface.

According to the above descriptions, the BIOS chip and the keyboard controller in the computer system monitor each other to determine whether the counter party remains in the idle state for a long time, and when one party remains in the idle state for a long time, the other party actively sends the hardware reset signal to reset the computer system. In this way, in case of system failure of the computer system, even if the computer system cannot be manually reset due to malfunction of a reset button or a battery thereof cannot be unplugged, the computer system can be automatically reset to recover a normal operating state.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
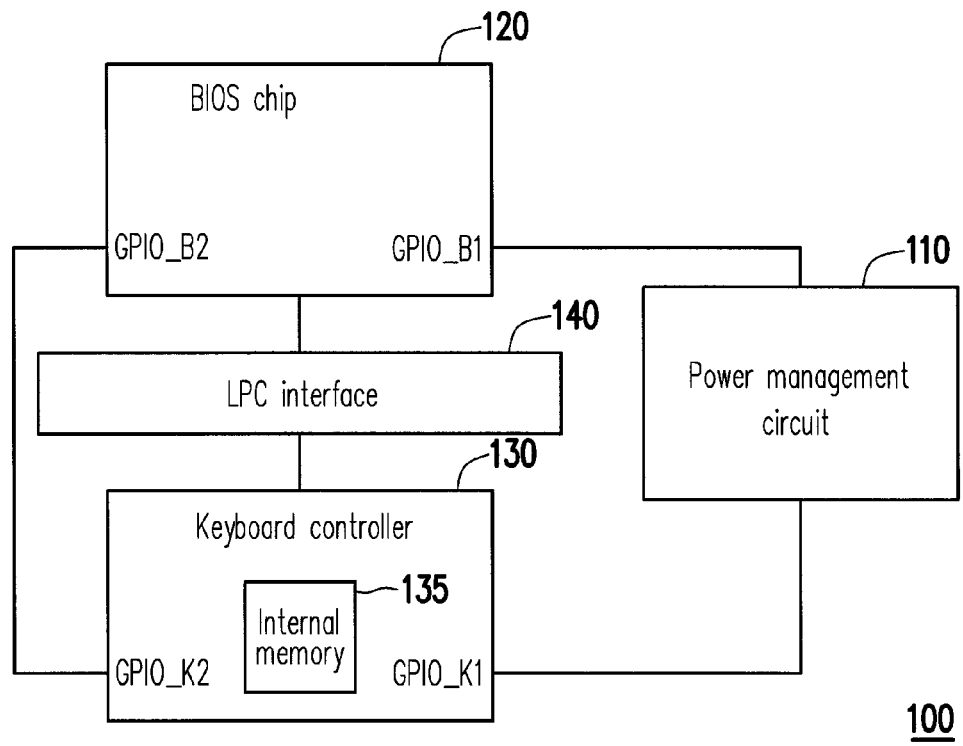
FIG. 1 is a block diagram of a computer system according to an embodiment of the invention.

FIG. 1 is a block diagram of a computer system according to an embodiment of the invention. Referring to FIG. 1, in the present embodiment, the computer system 100 includes a power management circuit 110, a basic input output system (BIOS) chip 120 and a keyboard controller 130. The computer system 100 is, for example, a laptop computer or a tablet PC, etc., which is not limited by the invention.

The power management circuit 110 includes a rectifier, a power management chip and a related circuit, and is used for managing a power of the computer system 100. The BIOS chip 120 is in charge of a booting procedure of the computer system 100 and serves as a communication medium between an operating system and hardware equipment of the computer system 100. The keyboard controller 130 is used for receiving data sent by an input device such as a keyboard or a mouse.

In the present embodiment, the BIOS chip 120 and the keyboard controller 130 are respectively coupled to the power management circuit 110 through general purpose input/output (GPIO) pins GPIO_B1 and GPIO_K1. The BIOS chip 120 and the keyboard controller 130 are communicated through a low pin count (LPC) interface 140. In detail, the BIOS chip 120 performs data reading or writing operations to an internal memory 135 of the keyboard controller 130 through the LPC interface 140. The internal memory 135 may be an embedded controller random access memory (ECRAM), and a size of the internal memory 135 is, for example, 256 bytes, though the invention is not limited thereto.

Moreover, a GPIO pin GPIO_B2 of the BIOS chip 120 is coupled to a GPIO pin GPIO_K2 of the keyboard controller 130. In this way, the keyboard controller 130 can transmit an interrupt signal to the BIOS chip 120 through the GPIO pins GPIO_K2 and GPIO_B2.

Figure 2:
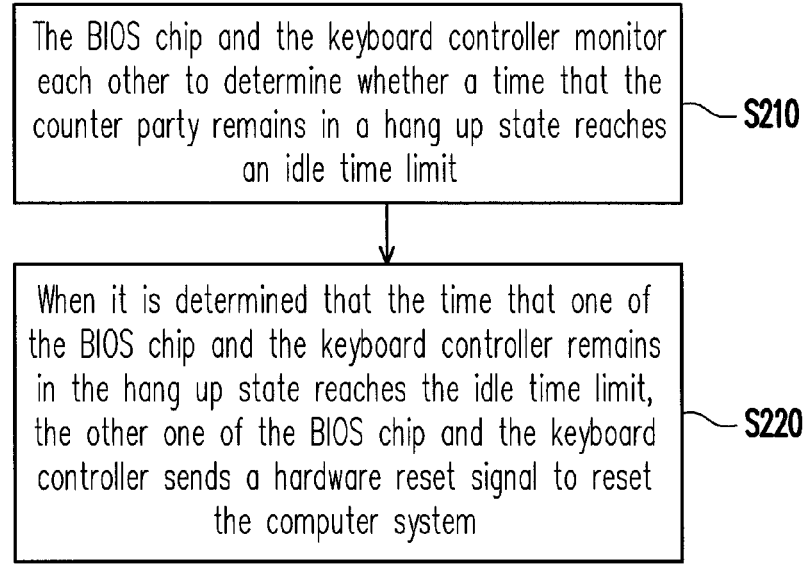
FIG. 2 is a flowchart illustrating a method for resetting a computer system according to an embodiment of the invention.

FIG. 2 is a flowchart illustrating a method for resetting a computer system according to an embodiment of the invention. In the present embodiment, as shown in a step S210, the BIOS chip 120 and the keyboard controller 130 may monitor each other to determine whether a time that the counter party remains in a hang up state (an abnormal state) reaches an idle time limit. The idle time limit is, for example, 20 seconds, though the invention is not limited thereto, and the mutual monitoring mechanism is described in detail later with reference of figures.

In step S220, when it is determined that the time that one of the BIOS chip 120 and the keyboard controller 130 remains in the hang up state reaches the idle time limit, the other one of the BIOS chip 120 and the keyboard controller 130 sends a hardware reset signal to control the power management circuit 110 to turn off and then turn on the power of the computer system 100, so as to reset the computer system 100.

As shown in FIG. 2, the BIOS chip 120 and the keyboard controller 130 detect each other to determine whether the counter party normally operates, and as long as one party is in the hang up state for an excessively long time, the other normally operated party sends the hardware reset signal to the power management circuit 110. In other words, in case of system failure, the computer system 100 can be automatically rebooted to try to recover the normal operation.

Figure 3:
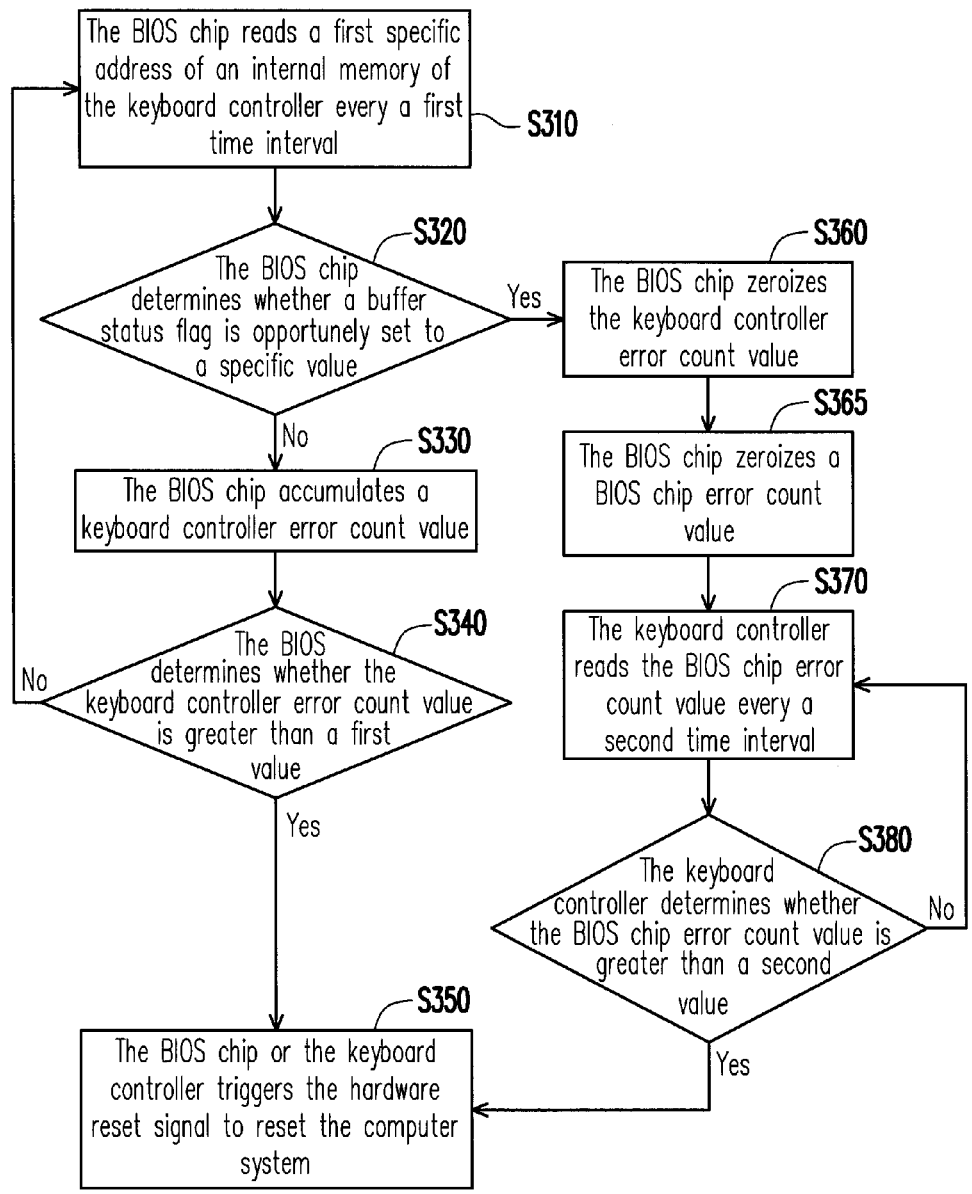
FIG. 3 is a flowchart illustrating a method for resetting a computer system according to another embodiment of the invention.

In order to describe the mutual monitoring mechanism of the BIOS chip 120 and the keyboard controller 130 in detail, another embodiment is provided below for descriptions. FIG. 3 is a flowchart illustrating a method for resetting a computer system according to another embodiment of the invention.

Referring to FIG. 1 and FIG. 3, in step S310, the BIOS chip 120 periodically reads a first specific address (for example, an address 0x77) of the internal memory 135 of the keyboard controller 130 every a first time interval. For example, the first time interval is 5 seconds (though the invention is not limited thereto), and a timer in a chipset (not shown) of the computer system 100 sends an interrupt signal every 5 seconds, and the chipset hands over a control right of the computer system 100 to the BIOS chip 120. Accordingly, the BIOS chip 120 reads the first specific address of the internal memory 135 through a command port (for example, 66h) and a data port (for example, 62h) of the LPC interface 140.

When the BIOS chip 120 sends a read command to the keyboard controller 130, if the keyboard controller 130 can normally operate, after receiving and processing the read command, the keyboard controller 130 sets a buffer status flag of the command port and the data port to a specific value, for example, sets an input buffer full (IBF) flag to 0. Therefore, in step S320, the BIOS chip 120 determines whether the buffer status flag is opportunely set to the specific value (for example, set to the specific value within 100 ms), so as to confirm whether the keyboard controller 130 normally operates.

If the buffer status flag is not opportunely set to the specific value, it represents that the keyboard controller 130 is in the hang up state that cannot opportunely process the read command, so that in step S330, the BIOS chip 120 accumulates a keyboard controller error count value by 1.

In step S340, the BIOS 120 determines whether the keyboard controller error count value is greater than a first value, where a product of the first time interval and the first value is smaller than or equal to the idle time limit. For example, the first time interval is 5 seconds and the idle time limit is 20 seconds, the first value is then a positive integer smaller than or equal to 4.

If the keyboard controller error count value is not greater than the first value, the BIOS chip 120 determines that a total time that the keyboard controller 130 remains in the hang up state does not reach the idle time limit. Now, the BIOS chip 120 waits for the timer in the chipset to again send the interrupt signal after the first time interval, so as to repeat the steps S310 to S340.

However, if the keyboard controller error count value is greater than the first value, the BIOS chip 120 determines that the total time that the keyboard controller 130 remains in the hang up state reaches the idle time limit, so that in step S350, the BIOS chip 120 sends the hardware reset signal to the power management circuit 110 through the GPIO pin GPIO_B1 to control the power management circuit 110 to turn off and then turn on the power of the computer system 100, so as to reset the computer system 100.

Referring back to the step S320, if the BIOS chip 120 determines that the buffer status flag is opportunely set to the specific value, it represents that the keyboard controller 130 normally operates (i.e. the keyboard controller 130 is in a normal working state). Then, regardless of the value of the current keyboard controller error count value, in step S360, the BIOS chip 120 zeroizes the keyboard controller error count value. In this way, a situation that the keyboard controller 130 is misjudged to be in the hang up state for a long time due to a slow processing speed of the keyboard controller 130 is avoided.

Moreover, since the BIOS chip 120 can perform the zeroizing operation, it represents that the BIOS chip 120 can normally operate (i.e. the BIOS chip 120 is in the normal working state). Therefore, in step S365, the BIOS chip 120 zeroizes a BIOS chip error count value recorded in a second specific address (for example, an address 0x88) of the internal memory 135.

In the present embodiment, in step S370, the keyboard controller 130 periodically reads the BIOS chip error count value every a second time interval, and accumulates the BIOS chip error count value by 1. In step S380, the keyboard controller 130 determines whether the BIOS chip error count value is greater than a second value, where a product of the second time interval and the second value has to be smaller than or equal to the idle time limit For example, if the second time interval is 1 second and the idle time limit is 20 seconds, the second value is then a positive integer smaller than or equal to 20.

If the BIOS chip error count value is not greater than the second value, the keyboard controller 130 determines the time that the BIOS chip 110 remains in the hang up state does not reach the idle time limit. After the second time interval is ended, the keyboard controller 130 repeats the steps S370 and S380.

When the BIOS chip error count value is greater than the second value, the keyboard controller 130 determines the time that the BIOS chip 120 remains in the hang up state reaches the idle time limit, so that in step S350, the keyboard controller 130 sends the hardware reset signal to the power management circuit 110 through the GPIO pin GPIO_K1 to control the power management circuit 110 to turn off and then turn on the power of the computer system 100, so as to reset the computer system 100.

As shown in FIG. 3, the steps S310-S340 can be regarded as a mechanism that the BIOS chip 120 monitors the keyboard controller 130, and the steps S360-S380 can be regarded as a mechanism that the keyboard controller 130 monitors the BIOS chip 120. Based on the mutual monitoring mechanism of the BIOS chip 120 and the keyboard controller 130, when a party is determined to be in the hang up state for a long time, the other party can actively trigger the hardware reset signal to reset the computer system 100.

Figure 4:
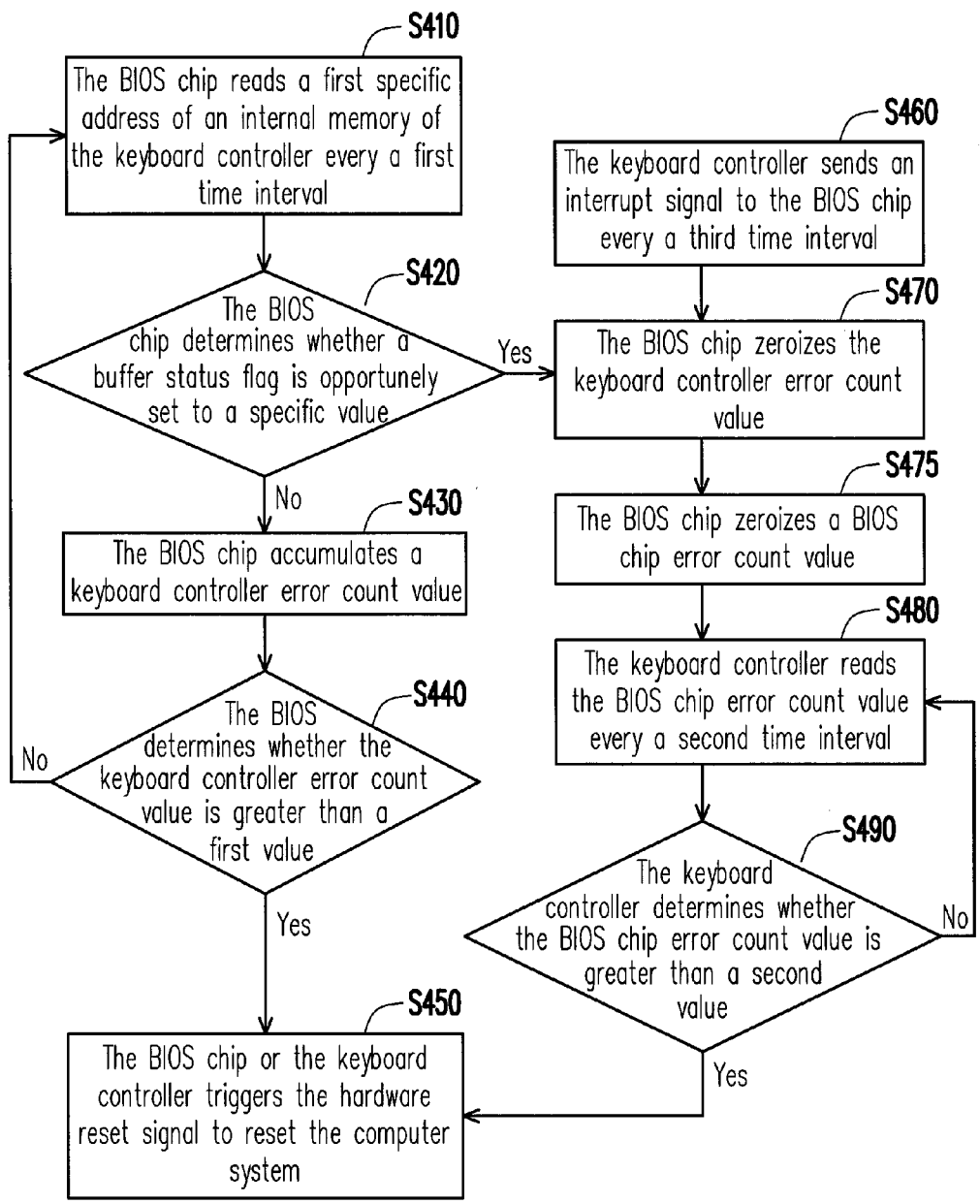
FIG. 4 is a flowchart illustrating a method for resetting a computer system according to still another embodiment of the invention.

FIG. 4 is a flowchart illustrating a method for resetting a computer system according to still another embodiment of the invention. Since steps S410-S450 and steps S470-S490 of FIG. 4 are the same or similar to the steps S310-S350 and the steps S360-S380, only differences there between are described below.

In the present embodiment, in step S460, the keyboard controller 130 periodically sends an interrupt signal to the BIOS chip 120 through the GPIO pins GPIO_K2 and GPIO_B2 every a third time interval (which has to be smaller than the idle time limit). The interrupt signal can be a system management interrupt (SMI) signal or a system control interrupt (SCI) signal.

Since only when the keyboard controller 130 normally operates, it can send the interrupt signal, the BIOS chip zeroizes the keyboard controller error count value after receiving the interrupt signal, as that shown in the step S470, and if the BIOS chip 120 can perform the above zeroizing operation, it represents that the BIOS chip 120 is in the normal working state. Therefore, in step S475, the BIOS chip 120 zeroizes the BIOS chip error count value. In other words, different to the embodiment of FIG. 3, in the present embodiment, except when the BIOS chip 120 determines that the buffer status flag is opportunely set to the specific value, when it receives the interrupt signal from the keyboard controller 130, it also zeroizes the keyboard controller error count value and the BIOS chip error count value.

For example, assuming the idle time limit is 20 seconds, the third time interval is 3 seconds and the second value is 20, since the BIOS chip 120 zeroizes the keyboard controller error count value and the BIOS chip error count value every 3 seconds in response to the interrupt signal sent by the keyboard controller 130, in case that the BIOS chip 120 normally operates, the BIOS chip error count value has no chance to be accumulated by 20 times, so that the keyboard controller 130 does not send the hardware reset signal to reset the computer system 100. Comparatively, in case that the BIOS chip 120 cannot normally operate, (i.e. the BIOS chip 120 does not zeroize the BIOS chip error count value at a suitable time point), the BIOS chip error count value is accumulated for more than 20 times. Now, the keyboard controller 130 can send the hardware reset signal to the power management circuit 110 to reset the computer system 100.

In summary, according to the computer system and the method for resetting the same of the invention, the BIOS chip and the keyboard controller in the computer system monitor each other to determine whether a counter party remains in the idle state for a long time. In this way, even if the BIOS chip or the keyboard controller cannot normally operate, the other party can actively send the hardware reset signal to reset the computer system, so as to try to recover a normal operating state of the computer system via resetting. Regarding the computer system with a battery uneasy to be unplugged, it can be automatically reset through the aforementioned mechanism in case of system failure. In case that the keyboard controller is hanged up for an excessively long time and the reset button cannot be used, the computer system can be reset through the aforementioned mechanism. In this way, the after-sale service cost required when the user sends the computer system back to the manufacturer's service station in case of the system failure of the computer system can be reduced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for resetting a computer system, the computer system comprising a basic input output system (BIOS) chip and a keyboard controller, and the method for resetting the computer system comprising:
    monitoring the keyboard controller by the BIOS chip to determine whether a time that the keyboard controller remains in a hang up state reaches an idle time limit;
    monitoring the BIOS chip by the keyboard controller to determine whether a time that the BIOS chip remains in the hang up state reaches the idle time limit; and
    when it is determined that the time of one of the BIOS chip and the keyboard controller remaining in the hang up state reaches the idle time limit, triggering a hardware reset signal by the other one of the BIOS chip and the keyboard controller to reset the computer system.

2. The method for resetting the computer system as claimed in claim 1, wherein the step of monitoring the keyboard controller by the BIOS chip to determine whether the time that the keyboard controller remains in the hang up state reaches the idle time limit comprises:
    reading a first specific address of an internal memory of the keyboard controller by the BIOS chip every a first time interval;
    determining by the BIOS chip whether a buffer status flag is opportunely set to a specific value;
    if not, accumulating a keyboard controller error count value by the BIOS chip;
    if yes, zeroizing the keyboard controller error count value by the BIOS chip; and
    repeating the above steps by the BIOS chip, and determining that the time that the keyboard controller remains in the hang up state reaches the idle time limit when the keyboard controller error count value is greater than a first value, wherein a product of the first time interval and the first value is smaller than or equal to the idle time limit.

3. The method for resetting the computer system as claimed in claim 2, wherein after the step of zeroizing the keyboard controller error count value by the BIOS chip, the method for resetting the computer system further comprises:
    zeroizing a BIOS chip error count value recorded in a second specific address of the internal memory by the BIOS chip.

4. The method for resetting the computer system as claimed in claim 3, wherein the step of monitoring the BIOS chip by the keyboard controller to determine whether the time that the BIOS chip remains in the hang up state reaches the idle time limit comprises:
    reading and accumulating the BIOS chip error count value by the keyboard controller every a second time interval; and
    repeating the above step by the keyboard controller, and determining the time that the BIOS chip remains in the hang up state reaches the idle time limit when the BIOS chip error count value is greater than a second value, wherein a product of the second time interval and the second value is smaller than or equal to the idle time limit.

5. The method for resetting the computer system as claimed in claim 4, further comprising:
    sending an interrupt signal to the BIOS chip by the keyboard controller every a third time interval, wherein the third time interval is smaller than the idle time limit; and
    zeroizing the keyboard controller error count value by the BIOS chip after receiving the interrupt signal.

6. A computer system, comprising:
    a power management circuit, managing a power of the computer system;
    a basic input output system (BIOS) chip, coupled to the power management circuit; and
    a keyboard controller, coupled to the power management circuit and the BIOS chip,
    wherein the BIOS chip monitors the keyboard controller to determine whether a time that the keyboard controller remains in a hang up state reaches an idle time limit, and the keyboard controller monitors the BIOS chip to determine whether a time that the BIOS chip remains in the hang up state reaches the idle time limit, when it is determined that the time of one of the BIOS chip and the keyboard controller remaining in the hang up state reaches the idle time limit, the other one of the BIOS chip and the keyboard controller sends a hardware reset signal to the power management circuit to control the power management circuit to turn off and then turn on the power of the computer system.

7. The computer system as claimed in claim 6, wherein the BIOS chip periodically reads a first specific address of an internal memory of the keyboard controller every a first time interval, and determines whether a buffer status flag is opportunely set to a specific value, when the buffer status flag is not opportunely set to the specific value, the BIOS chip accumulates a keyboard controller error count value, and when the buffer status flag is opportunely set to the specific value, the BIOS chip zeroizes the keyboard controller error count value, when the keyboard controller error count value is greater than a first value, the BIOS chip determines the time that the keyboard controller remains in the hang up state reaches the idle time limit, wherein a product of the first time interval and the first value is smaller than or equal to the idle time limit.

8. The computer system as claimed in claim 7, wherein after the BIOS chip zeroizes the keyboard controller error count value, the BIOS chip zeroizes a BIOS chip error count value recorded in a second specific address of the internal memory.

9. The computer system as claimed in claim 8, wherein the keyboard controller periodically reads and accumulates the BIOS chip error count value every a second time interval, when the BIOS chip error count value is greater than a second value, the keyboard controller determines the time that the BIOS chip remains in the hang up state reaches the idle time limit, wherein a product of the second time interval and the second value is smaller than or equal to the idle time limit.

10. The computer system as claimed in claim 9, wherein the keyboard controller periodically sends an interrupt signal to the BIOS chip every a third time interval, the BIOS chip zeroizes the keyboard controller error count value after receiving the interrupt signal, wherein the third time interval is smaller than the idle time limit.

11. The computer system as claimed in claim 6, wherein the BIOS chip and the keyboard controller respectively transmit the hardware reset signal to the power management circuit through a general purpose input/output pin.

12. The computer system as claimed in claim 6, wherein the BIOS chip and the keyboard controller are communicated though a low pin count (LPC) interface.

* * * * *